United States Patent
Xu et al.

(10) Patent No.: US 11,285,928 B2
(45) Date of Patent: Mar. 29, 2022

(54) ELECTRICAL PARKING BRAKE SYSTEM COMPATIBLE WITH AUTOHOLD FUNCTION, STARTING METHOD AND VEHICLE

(71) Applicant: Guangzhou Automobile Group Co., Ltd., Guangdong (CN)

(72) Inventors: Wei Xu, Guangdong (CN); Liang Huang, Guangdong (CN); Huantao Li, Guangdong (CN); Qinglin Chen, Guangdong (CN); Saisai Li, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 404 days.

(21) Appl. No.: 16/302,682

(22) PCT Filed: Nov. 17, 2017

(86) PCT No.: PCT/CN2017/111476
§ 371 (c)(1),
(2) Date: Nov. 19, 2018

(87) PCT Pub. No.: WO2018/090959
PCT Pub. Date: May 24, 2018

(65) Prior Publication Data
US 2020/0307528 A1  Oct. 1, 2020

(30) Foreign Application Priority Data
Nov. 17, 2016  (CN) .......................... 201611027270.7

(51) Int. Cl.
*B60T 7/12* (2006.01)
*B60T 1/06* (2006.01)
*B60T 13/74* (2006.01)

(52) U.S. Cl.
CPC ........ *B60T 7/12* (2013.01); *B60T 1/06* (2013.01); *B60T 13/74* (2013.01); *B60T 2201/10* (2013.01); *B60T 2250/04* (2013.01)

(58) Field of Classification Search
CPC ........ B60T 2250/04; B60T 7/045; B60T 7/12; B60T 7/122; B60T 2201/06; B60T 2201/10; B60T 1/06; B60T 13/74; B60T 2260/00
(Continued)

(56) References Cited

U.S. PATENT DOCUMENTS 3,544,171 A   12/1970  Lester et al.
11,095,307 B2*  8/2021  Miele ........................ G06T 1/20
(Continued)

FOREIGN PATENT DOCUMENTS

CN   101934737 A   1/2011
CN   101941436 A   1/2011
(Continued)

OTHER PUBLICATIONS

International Search Report for PCT application No. PCT/CN2017/111476 filed on Nov. 17, 2017, dated Feb. 22, 2018.

*Primary Examiner* — Atul Trivedi
(74) *Attorney, Agent, or Firm* — ScienBiziP, P.C.

(57) ABSTRACT

Disclosed are an EPB compatible with an autohold function, a starting method and a vehicle. According to the EPB, during starting, by converting the vehicle from a brake state where the EPB acts into a brake state where an autohold function acts and enabling the vehicle to start from the brake state where the autohold function acts, the vehicle is started stably, the starting noise of the vehicle is reduced and the driving experience is improved.

11 Claims, 1 Drawing Sheet

(58) Field of Classification Search
USPC .......................................................... 701/70
See application file for complete search history.

(56) References Cited

U.S. PATENT DOCUMENTS

| | | | | |
|---|---|---|---|---|
| 2004/0024513 | A1 | 2/2004 | Aizawa et al. | |
| 2008/0086253 | A1* | 4/2008 | Nakayama | B60T 7/122 |
| | | | | 701/80 |
| 2008/0294319 | A1* | 11/2008 | Baijens | B60T 8/24 |
| | | | | 701/70 |
| 2010/0004095 | A1* | 1/2010 | Sokoll | B60T 7/122 |
| | | | | 477/198 |
| 2010/0100278 | A1* | 4/2010 | Saito | B60T 13/662 |
| | | | | 701/29.2 |
| 2013/0073163 | A1* | 3/2013 | Liu | B60W 30/18027 |
| | | | | 701/70 |
| 2016/0032995 | A1* | 2/2016 | Nishino | F16D 55/226 |
| | | | | 188/72.3 |
| 2020/0148208 | A1* | 5/2020 | Choi | B60L 7/18 |
| 2021/0188254 | A1* | 6/2021 | Kumazawa | B60L 7/24 |

FOREIGN PATENT DOCUMENTS

| | | | | |
|---|---|---|---|---|
| CN | 102416934 | A | | 4/2012 |
| CN | 102849051 | A | | 1/2013 |
| CN | 202966277 | U | | 6/2013 |
| CN | 103318031 | A * | 9/2013 | ................ B60T 7/22 |
| CN | 104228796 | A | | 12/2014 |
| CN | 105313862 | A * | 2/2016 | ........... F16D 65/183 |
| CN | 106064610 | A | | 11/2016 |
| CN | 106627547 | A | | 5/2017 |
| CN | 107380146 | A * | 11/2017 | |
| CN | 110182190 | A * | 8/2019 | |
| CN | 110962813 | A * | 4/2020 | |
| CN | 110341667 | B * | 9/2020 | |
| CN | 111873964 | A * | 11/2020 | |
| CN | 111923909 | A * | 11/2020 | |
| CN | 110562220 | B * | 12/2020 | |
| CN | 112109560 | A * | 12/2020 | |
| CN | 107054336 | B * | 4/2021 | .............. B60T 7/122 |
| DE | 102017118529 | A1 * | 2/2019 | ........... B60T 13/662 |
| EA | 035918 | B1 * | 8/2020 | .............. B60T 13/68 |
| FR | 2813837 | A1 * | 3/2002 | ................ B60T 7/12 |
| JP | 2008068835 | A * | 3/2008 | ......... B60L 15/2018 |
| JP | 2008094142 | A * | 4/2008 | .............. B60T 7/122 |
| JP | 2008265551 | A * | 11/2008 | ................ B60T 7/12 |
| JP | 2012035773 | A * | 2/2012 | |
| JP | 2013533165 | A * | 8/2013 | .............. B60T 7/042 |
| JP | 5673619 | B2 * | 2/2015 | ................ B60T 8/17 |
| JP | 2017149215 | A * | 8/2017 | |
| JP | 6299837 | B1 * | 3/2018 | |
| JP | 2018065477 | A * | 4/2018 | |
| WO | WO-2007028587 | A1 * | 3/2007 | ........... B60T 13/683 |
| WO | WO-2014013971 | A1 * | 1/2014 | .............. B60T 7/122 |
| WO | WO-2019163597 | A1 * | 8/2019 | ........... B60T 13/745 |

* cited by examiner

ELECTRICAL PARKING BRAKE SYSTEM COMPATIBLE WITH AUTOHOLD FUNCTION, STARTING METHOD AND VEHICLE

TECHNICAL FIELD

The present disclosure relates to the field of vehicle control systems, and more particularly, to an Electrical Park Brake (EPB) compatible with an autohold function, a method for starting a vehicle based on the EPB and the vehicle started by using the method.

BACKGROUND

At present, most park brake systems applied to a motor vehicle brake system are conventional mechanical park brake systems. A conventional mechanical park brake system is mostly composed of a park brake pull rod, a pull wire and a brake. When it is used, a driver needs to manually control the pull rod to perform operations such as braking in parking or releasing in starting. However, the conventional mechanical park brake system often brings many operation inconveniences for the driver. For example, when a vehicle is started, the driver not only needs to control steering, but also controls an accelerator and a clutch and further releases a parking pull rod. If the parking pull rod is released too early, a danger such as slope sliding will be occurred. If the parking pull rod is released too late, an engine may be in a flameout. For another example, the parking pull rod occupies arrangement spaces for other parts of the vehicle, so the driving comfort is reduced.

In order to improve the driving experience and optimize arrangement spaces in the vehicles, an EPB is adopted by more and more vehicles. The EPB includes a brake, an executor and other parts. A controller outputs an execution signal via a received signal, and the executor brakes two rear wheels of the vehicle according to the signal.

Technical Problems

When a large accelerator of the vehicle is started, as the EPB slowly releases the rear wheels, a relatively obvious drag feeling can be generated. Further, when the vehicle is started on a slope, since the EPB only brakes the rear wheels, after the brake is loosened, front wheels provide a power to pull forward, the rear wheels are not completely released due to a relatively long response time of the EPB and the vehicle has a pitching change to affect the driving experience. At last, the EPB has a relatively large noise when the wheels are released.

SUMMARY

Technical Solutions

The present disclosure is intended to provide an EPB compatible with an autohold function, a method for starting a vehicle based on the EPB and the vehicle started by using the method. By adopting the system, the vehicle can be started stably, the starting noise of the vehicle is reduced and the driving experience is improved.

The embodiment of the present disclosure provides an EPB compatible with an autohold function, which may include an information collection unit, a control unit and an execution unit; the information collection unit collects information for judging whether the autohold function can be started or not, information on a change of a vehicle gear and information on an openness of a vehicle accelerator, and transfers the information to the control unit; the control unit makes a judgment according to the information; under a condition in which a vehicle begins to start and is in a brake state where the EPB acts, a state of the vehicle meets a start condition of the EPB and the vehicle is switched from a Parking (P) gear, the control unit enables the vehicle to convert from the brake state where the EPB acts into a brake state where the autohold function acts via the execution unit; and when the vehicle is changed to brake by the autohold function and the accelerator openness of the vehicle is greater than a preset accelerator openness threshold value, the control unit closes the autohold function via the execution unit and the vehicle is started.

In another embodiment, when the vehicle brakes by the EPB, the EPB brakes two rear wheels of the vehicle; and when the vehicle brakes by the autohold function, the autohold function brakes four wheels of the vehicle.

In another embodiment, when the state of the vehicle does not meet the start condition of the autohold function but the vehicle has a start intention, the EPB relieves the braking on the vehicle and the vehicle completes the starting.

In another embodiment, the information for judging whether the autohold function can be started or not includes: state information on an autohold functional switch, state information on a main-driver door, state information on a safety belt, operation state information on an engine, pressure information on a brake main cylinder and vehicle speed information; and when the autohold functional switch is in an on state, the main-driver door is closed, the safety belt is fastened, the engine is in an operation state and its rotational speed is nonzero, the pressure of the brake main cylinder is greater than a preset pressure threshold value and the vehicle speed is not higher than a preset vehicle speed threshold value, the autohold function meets the start condition.

In another embodiment, after the vehicle is converted from the brake state where the EPB acts into the brake state where the autohold function acts, the EPB further needs to collect rotational speed information and torque information of the engine as well as an operation state signal of the engine.

In another embodiment, the control unit is arranged in the EPB and/or an Electronic Stability Program (ESP); and the EPB and the ESP implement the interaction of the signal via a hardware signal or a Controller Area Network (CAN) signal.

The embodiment of the present disclosure further provides a starting method of a vehicle. The method is based on the EPB compatible with the autohold function provided by the above embodiments of present disclosure and may include the following steps.

When the vehicle begins to start and is in a brake state where the EPB acts, information for judging whether the autohold function can be started or not, information on a change of a vehicle gear and information on an openness of a vehicle accelerator are collected by an information collection unit and the above information is transferred to a control unit.

A judgment is made by the control unit according to the information transferred by the information collection unit; and when a state of the vehicle meets a start condition of the EPB and the vehicle is switched from a P gear, the control unit enables the vehicle to convert from the brake state where the EPB acts into a brake state where the autohold function acts via an execution unit.

When the vehicle brakes by the autohold function and the accelerator openness of the vehicle is greater than a preset accelerator openness threshold value, the control unit closes the autohold function via the execution unit and the vehicle is started.

The embodiment of the present disclosure further provides a vehicle, which is started by using the starting method provided by the above embodiments of the present disclosure.

Beneficial Effects of the Invention

Beneficial Effects

In the above embodiments of the present disclosure, during starting, by converting the vehicle from the brake state where the EPB acts into the brake state where the autohold function acts and enabling the vehicle to start from the brake state where the autohold function acts, the vehicle is started stably, the starting noise of the vehicle is reduced and the driving experience is improved.

BRIEF DESCRIPTION OF THE DRAWINGS

Description of the Drawings

Figure 1:
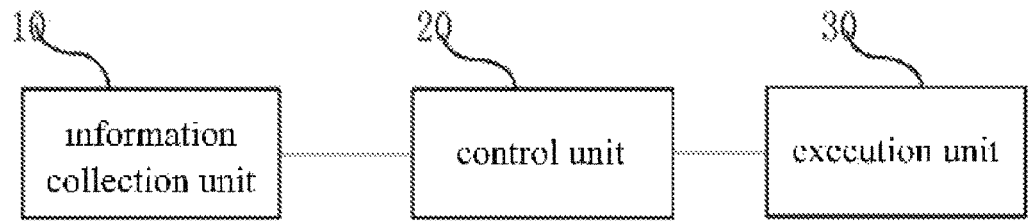

FIG. 1 is a systematic block diagram of an EPB compatible with an autohold function provided by an embodiment of the present disclosure.

Figure 2:
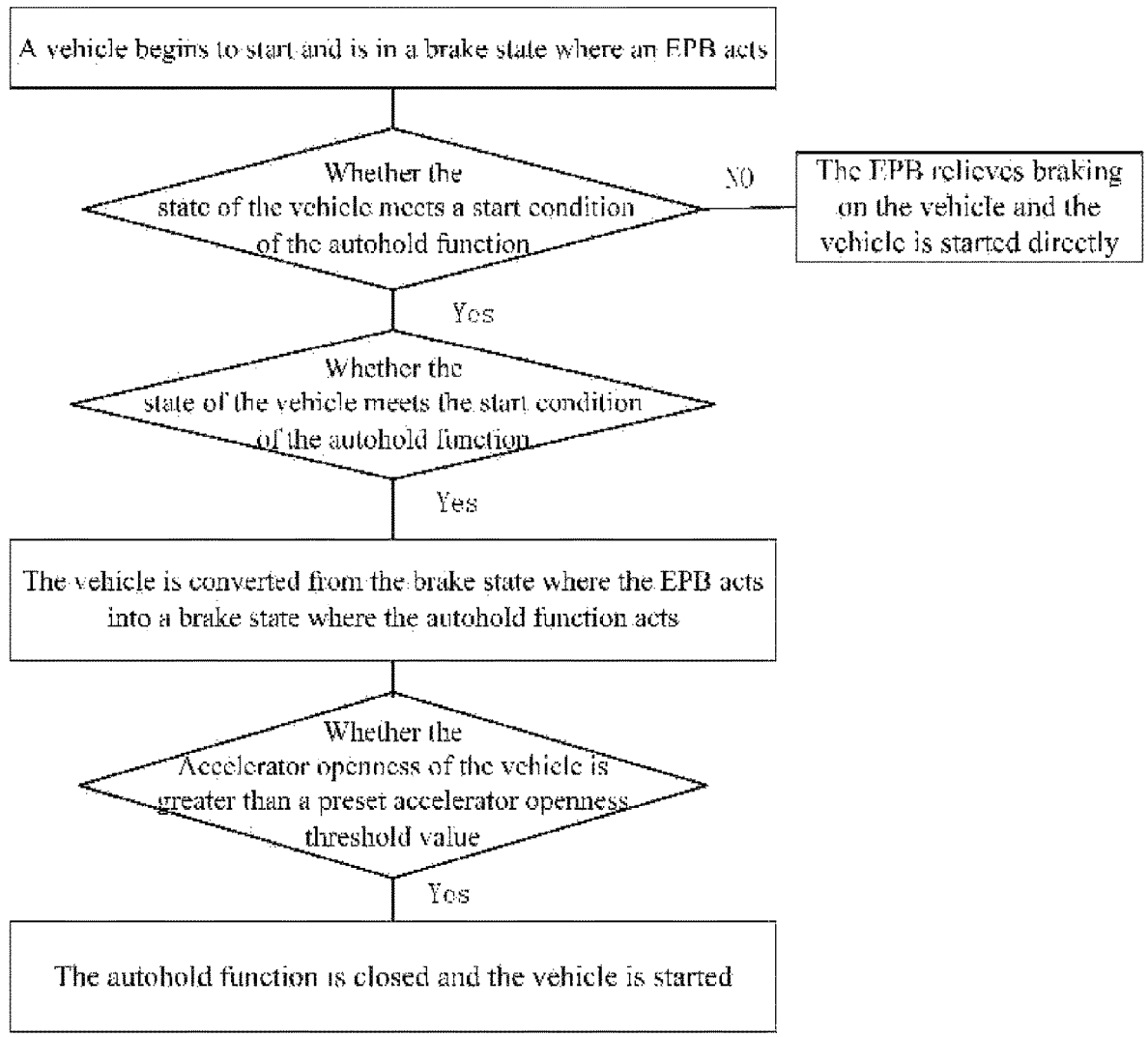

FIG. 2 is a flowchart for starting an EPB provided by an embodiment of the present disclosure.

DETAILED DESCRIPTION OF THE EMBODIMENTS

Embodiments of the Invention

In order to further illustrate the technical means that the present disclosure adopts for achieving the foregoing objectives and effects thereof, with combination of the accompanying drawings and preferred embodiments, the specific implementing means, structures, features as well as the effects thereof of the present disclosure will be described in detail below.

FIG. 1 is a systematic block diagram of an EPB compatible with an autohold function provided by an embodiment of the present disclosure. FIG. 2 is a flowchart for starting an EPB provided by an embodiment of the present disclosure. As shown in FIG. 1 and FIG. 2, in this embodiment, the EPB compatible with the autohold function may include an information collection unit 10, a control unit 20 and an execution unit 30; the information collection unit 10 collects information for judging whether the autohold function can be started or not, information on a change of a vehicle gear and information on an openness of a vehicle accelerator, and transfers the information to the control unit 20; the control unit 20 receives the information collected by the information collection unit 10 and makes a judgment according to the information; under a condition in which a vehicle begins to start and is in a brake state where the EPB acts, a state of the vehicle meets a start condition of the EPB and the vehicle is switched from a P gear, the control unit 20 enables the vehicle to convert from the brake state where the EPB acts into a brake state where the autohold function acts via the execution unit 30; that is, the vehicle is converted from a rear-two-wheel brake state where a motor acts into a hydraulic four-wheel brake state; and thereafter, when the vehicle is changed to brake by the autohold function and the accelerator openness of the vehicle is greater than a preset accelerator openness threshold value, the control unit 20 closes the autohold function via the execution unit 30 and the vehicle is started.

It is to be noted that, in the present disclosure, when the vehicle brakes by the EPB, it is implemented by enabling the motor to drive a brake caliper to brake two rear wheels of the vehicle, thereby keeping the vehicle stationary; and when the vehicle brakes via the autohold function, it is implemented by enabling a hydraulic pressure to brake four wheels of the vehicle, thereby keeping the vehicle stationary.

In the present disclosure, when the vehicle brakes by the EPB, the EPB brakes the two rear wheels of the vehicle; and when the vehicle brakes by the autohold function, the autohold function brakes the four wheels of the vehicle. The EPB is implemented via collection and judgment of the information. When the state of the vehicle meets a trigger condition of the autohold function and the gear of the vehicle changes, i.e., the vehicle is converted from the P gear to other gears such as a Neutral (N) gear, a Drive (D) gear or a Reverse (R) gear, the vehicle is converted from the brake state where the EPB acts into the brake state where the autohold function acts; that is, at this moment, the vehicle is converted from the rear-two-wheel brake state where the motor acts into the hydraulic four-wheel brake state. At this moment, the driver releases a brake pedal and the vehicle still keeps stationary. When the accelerator openness of the vehicle is greater than a preset accelerator openness threshold value, i.e., the system judges that the driver has a driving intention at this moment, the starting of the vehicle is completed by closing the autohold function. Since the autohold function brakes via the four wheels of the vehicle, the weight of the vehicle does not change in parking and starting and thus there is no pitching change and the starting process is relatively stable. On the other hand, since the autohold function is the hydraulic brake when braking the vehicle, the speed for releasing the wheel is relatively fast and the noise is relatively low. That is, by adopting the EPB compatible with the autohold function provided by the present disclosure, the vehicle is started stably, the starting noise of the vehicle is reduced and the driving experience is improved. Further, the judgment information required in the present disclosure all may be collected by an existing information collection apparatus of the vehicle, so the cost is not increased.

In another embodiment, when the vehicle begins to start and is in the brake state where the EPB acts, if the state of the vehicle at this moment does not meet the start condition of the autohold function but the vehicle has a start intention, for example, the vehicle is switched from the P gear and the accelerator openness of the vehicle is greater than the preset accelerator openness threshold value of the vehicle, the EPB relieves the braking on the two rear wheels of the vehicle, the autohold function is not started and the vehicle completes the starting. That is, when the vehicle does not meet the start condition of the autohold function but the vehicle has the starting intention, the vehicle is still started according to a starting manner of the existing EPB.

In another embodiment, in this embodiment, the information for judging whether the autohold function can be started or not includes: state information on an autohold functional switch, state information on a main-driver door, state information on a safety belt, operation state information on an engine, pressure information on a brake main cylinder and vehicle speed information; and when the autohold functional switch is in an on state, the main-driver door is closed, the safety belt is fastened, the engine is in an operation state and its rotational speed is nonzero, the pressure of the brake main cylinder is greater than a preset pressure threshold value and the vehicle speed is not higher than a preset vehicle speed threshold value, the autohold function meets the start condition.

In another embodiment, in this embodiment, after the vehicle is converted from the brake state where the EPB acts into the brake state where the autohold function acts, the EPB further needs to collect rotational speed information and torque information of the engine as well as an operation state signal of the engine via a CAN signal or a hardware signal to judge whether the vehicle can be started normally or not.

In the present disclosure, specific elements of the information collection unit 10 and the execution unit 30 may be existing elements on the vehicle. The information collected by the information collection unit 10 may be transferred to the control unit 20 via the hardware signal or the CAN signal; a control signal sent out by the control unit 20 may be transferred to the execution unit 30 via the hardware signal or the CAN signal. For the corresponding specific elements of each piece of information, the corresponding execution unit 30 when the EPB brakes and the corresponding execution unit 30 when the autohold function brakes, please refer to the conventional art, all of which will not be repeated here.

In this embodiment, the control unit 20 is arranged in the EPB. That is, the EPB collects the information on whether the autohold function can be implemented or not, the information on the change of the vehicle gear and the information on the openness of the vehicle accelerator from the CAN signal or the hardware signal and makes a judgment on the above information. When the state of the vehicle meets a conversion condition from the brake state where the EPB acts to the brake state where the autohold function acts, the EPB loosens the braking on the two rear wheels of the vehicle and sends a signal to an ESP, so that the ESP starts the autohold function and brakes the four wheels of the vehicle.

It may be understood that the control unit 20 may also be arranged in the ESP. that is, the ESP collects the information on whether the autohold function can be implemented or not, the information on the change of the vehicle gear and the information on the openness of the vehicle accelerator from the CAN signal or the hardware signal and makes a judgment on the above information. When the state of the vehicle meets the conversion condition from the brake state where the EPB acts to the brake state where the autohold function acts, the ESP sends a signal to the EPB, so that the EPB loosens the braking on the two rear wheels of the vehicle; and meanwhile, the EPB starts the autohold function to brake the four wheels of the vehicle.

In other embodiments, the ESP and the EPB both may collect own required information independently via the information collection unit 10; and the ESP and the EPB are independently controlled to turn on or turn off according to the above information.

In other words, in the present disclosure, the control unit 20 of the EPB cannot be narrowly understood as an own Electronic Control Unit (ECU) 20. The control unit 20 may be distributed in the EPB and/or the ESP; and the EPB and the ESP implement the interaction of the signal via the hardware signal or the CAN signal to complete the starting of the vehicle.

The disclosure further provides a starting method based on the EPB compatible with the autohold function, which may include the following steps.

When the vehicle begins to start and is in a brake state where the EPB acts, information for judging whether the autohold function can be started or not, information on a change of a vehicle gear and information on an openness of a vehicle accelerator are collected by an information collection unit 10 and the above information is transferred to a control unit 20.

A judgment is made by the control unit 20 according to the information transferred by the information collection unit 10; and when a state of the vehicle meets a start condition of the EPB and the vehicle is switched from a P gear, the control unit 20 enables the vehicle to convert from the brake state where the EPB acts into a brake state where the autohold function acts via an execution unit 30.

When the vehicle brakes by the autohold function and the accelerator openness of the vehicle is greater than a preset accelerator openness threshold value, the control unit 20 closes the autohold function via the execution unit 30 and the vehicle is started.

To sum up, in the present disclosure, during starting, by converting the vehicle from the brake state where the EPB acts into the brake state where the autohold function acts and enabling the vehicle to start from the brake state where the autohold function acts, the vehicle is started stably, the starting noise of the vehicle is reduced and the driving experience is improved.

The present disclosure further provides a vehicle, which is started by using the starting method provided by the present disclosure. For other technical features of the vehicle, please refer to the conventional art, all of which will not be repeated here.

The above are merely preferred embodiments of the present disclosure and are not intended to limit the present disclosure. Any modification, equivalent replacement, improvement and the like made within the spirit and principle of the present disclosure should be included in a scope of protection of the present disclosure.

INDUSTRIAL APPLICABILITY

In the EPB compatible with the autohold function provided by the embodiments of the present disclosure, during starting, by converting the vehicle from the brake state where the EPB acts into the brake state where the autohold function acts and enabling the vehicle to start from the brake state where the autohold function acts, the vehicle is started stably, the starting noise of the vehicle is reduced and the driving experience is improved.

What is claimed is:

1. An Electrical Park Brake (EPB), which is compatible with an autohold function, comprising an information collection unit, a control unit and an execution unit, wherein
the information collection unit is configured to collect information for judging whether the autohold function can be started or not, information on a change of a vehicle gear and information on an openness of a vehicle accelerator, and transfer the information to the control unit;
the control unit is configured to make a judgment according to the information; under a condition in which a vehicle begins to start and is in a brake state where the EPB acts, a state of the vehicle meets a start condition of the EPB and the vehicle is switched from a Parking (P) gear, the control unit enables the vehicle to convert from the brake state where the EPB acts into a brake state where the autohold function acts via the execution unit; and when the vehicle is changed to brake by the autohold function and the accelerator openness of the vehicle is greater than a preset accelerator openness threshold value, the control unit closes the autohold function via the execution unit and the vehicle is started;

wherein when the vehicle brakes by the EPB, the EPB brakes two rear wheels of the vehicle; and when the vehicle brakes by the autohold function, the autohold function brakes four wheels of the vehicle.

2. The EPB as claimed in claim 1, wherein when the state of the vehicle does not meet the start condition of the autohold function but the vehicle has a start intention, the EPB relieves the braking on the vehicle and the vehicle completes the starting.

3. A method for starting a vehicle, based on the EPB as claimed in claim 2 and comprising:

when the vehicle begins to start and is in a brake state where the EPB acts, collecting, by an information collection unit, information for judging whether the autohold function can be started or not, information on a change of a vehicle gear and information on an openness of a vehicle accelerator and transferring the above information to a control unit;

making, by the control unit, a judgment according to the information transferred by the information collection unit; and when a state of the vehicle meets a start condition of the EPB and the vehicle is switched from a P gear, enabling, by the control unit, the vehicle to convert from the brake state where the EPB acts into a brake state where the autohold function acts via an execution unit; and when the vehicle brakes by the autohold function and the accelerator openness of the vehicle is greater than a preset accelerator openness threshold value, closing, by the control unit, the autohold function via the execution unit and starting the vehicle.

4. The EPB as claimed in claim 1, wherein the information for judging whether the autohold function can be started or not comprises: state information on an autohold functional switch, state information on a main-driver door, state information on a safety belt, operation state information on an engine, pressure information on a brake main cylinder and vehicle speed information; and when the autohold functional switch is in an on state, the main-driver door is closed, the safety belt is fastened, the engine is in an operation state and its rotational speed is nonzero, the pressure of the brake main cylinder is greater than a preset pressure threshold value and the vehicle speed is not higher than a preset vehicle speed threshold value, the autohold function meets the start condition.

5. A method for starting a vehicle, based on the EPB as claimed in claim 4 and comprising:

when the vehicle begins to start and is in a brake state where the EPB acts, collecting, by an information collection unit, information for judging whether the autohold function can be started or not, information on a change of a vehicle gear and information on an openness of a vehicle accelerator and transferring the above information to a control unit;

making, by the control unit, a judgment according to the information transferred by the information collection unit; and when a state of the vehicle meets a start condition of the EPB and the vehicle is switched from a P gear, enabling, by the control unit, the vehicle to convert from the brake state where the EPB acts into a brake state where the autohold function acts via an execution unit; and when the vehicle brakes by the autohold function and the accelerator openness of the vehicle is greater than a preset accelerator openness threshold value, closing, by the control unit, the autohold function via the execution unit and starting the vehicle.

6. The EPB as claimed in claim 1, wherein after the vehicle is converted from the brake state where the EPB acts into the brake state where the autohold function acts, the EPB in another embodiment needs to collect rotational speed information and torque information of the engine as well as an operation state signal of the engine.

7. A method for starting a vehicle, based on the EPB as claimed in claim 6 and comprising:

when the vehicle begins to start and is in a brake state where the EPB acts, collecting, by an information collection unit, information for judging whether the autohold function can be started or not, information on a change of a vehicle gear and information on an openness of a vehicle accelerator and transferring the above information to a control unit;

making, by the control unit, a judgment according to the information transferred by the information collection unit; and when a state of the vehicle meets a start condition of the EPB and the vehicle is switched from a P gear, enabling, by the control unit, the vehicle to convert from the brake state where the EPB acts into a brake state where the autohold function acts via an execution unit; and when the vehicle brakes by the autohold function and the accelerator openness of the vehicle is greater than a preset accelerator openness threshold value, closing, by the control unit, the autohold function via the execution unit and starting the vehicle.

8. The as claimed in claim 1, wherein the control unit is arranged in the EPB and/or an Electronic Stability Program (ESP); and the EPB and the ESP implement the interaction of the signal via a hardware signal or a Controller Area Network (CAN) signal.

9. A method for starting a vehicle, based on the EPB as claimed in claim 8 and comprising:

when the vehicle begins to start and is in a brake state where the EPB acts, collecting, by an information collection unit, information for judging whether the autohold function can be started or not, information on a change of a vehicle gear and information on an openness of a vehicle accelerator and transferring the above information to a control unit;

making, by the control unit, a judgment according to the information transferred by the information collection unit; and when a state of the vehicle meets a start condition of the EPB and the vehicle is switched from a P gear, enabling, by the control unit, the vehicle to convert from the brake state where the EPB acts into a brake state where the autohold function acts via an execution unit; and when the vehicle brakes by the autohold function and the accelerator openness of the vehicle is greater than a preset accelerator openness threshold value, closing, by the control unit, the autohold function via the execution unit and starting the vehicle.

10. A method for starting a vehicle, based on the EPB as claimed in claim 1 and comprising:

when the vehicle begins to start and is in a brake state where the EPB acts, collecting, by an information collection unit, information for judging whether the autohold function can be started or not, information on a change of a vehicle gear and information on an openness of a vehicle accelerator and transferring the above information to a control unit;

making, by the control unit, a judgment according to the information transferred by the information collection unit; and when a state of the vehicle meets a start condition of the EPB and the vehicle is switched from a P gear, enabling, by the control unit, the vehicle to convert from the brake state where the EPB acts into a brake state where the autohold function acts via an execution unit; and when the vehicle brakes by the autohold function and the accelerator openness of the vehicle is greater than a preset accelerator openness threshold value, closing, by the control unit, the autohold function via the execution unit and starting the vehicle;

wherein when the vehicle brakes by the EPB, the EPB brakes two rear wheels of the vehicle; and when the vehicle brakes by the autohold function, the autohold function brakes four wheels of the vehicle.

11. A vehicle, which is started by using the starting method as claimed in claim 10.

* * * * *